United States Patent [19]
Nakazawa

[11] Patent Number: 6,010,198
[45] Date of Patent: Jan. 4, 2000

[54] AUTOMOTIVE BRAKE CONTROL SYSTEM WITH SKID CONTROL UNIT AND TRACTION AND VEHICLE DYNAMICS CONTROL UNIT

[75] Inventor: Chiharu Nakazawa, Kawasaki, Japan

[73] Assignee: Unisia Jecs Corporation, Atsugi, Japan

[21] Appl. No.: 09/041,728

[22] Filed: Mar. 13, 1998

[30] Foreign Application Priority Data

Mar. 14, 1997 [JP] Japan ..................................... 9-060312

[51] Int. Cl.⁷ .............................. B60T 8/34; B60T 13/16; B60T 8/40
[52] U.S. Cl. .................................... 303/113.1; 303/116.1; 303/10
[58] Field of Search .............................. 303/10, 125, 187, 303/189, 113.1, 113.2, 133.3, 139, 115.1, 116.1, 116.2, 119.1

[56] References Cited

U.S. PATENT DOCUMENTS

| | | | |
|---|---|---|---|
| 5,205,623 | 4/1993 | Holzmann et al. | 303/113.2 |
| 5,246,280 | 9/1993 | Sigl | 303/113.2 |
| 5,295,740 | 3/1994 | Watanabe et al. | 303/113.2 |
| 5,322,363 | 6/1994 | Sekiguchi et al. | 303/113.2 |
| 5,407,257 | 4/1995 | Iwata | 303/113.2 |
| 5,938,296 | 8/1999 | Nakazawa | 303/113.2 |

FOREIGN PATENT DOCUMENTS

| | | |
|---|---|---|
| 7-501506 | 2/1995 | Japan . |
| WO 94/07720 | 4/1994 | WIPO . |

*Primary Examiner*—Christopher P. Schwartz
*Assistant Examiner*—Jeffrey Woller
*Attorney, Agent, or Firm*—Foley & Lardner

[57] ABSTRACT

An automotive brake control system with a skid control hydraulic unit and a pressure apply pump-and-piston device, comprises a single motor having a driving connection both an ABS return pump and a pressure apply pump, a circulation circuit being connected between a pressure introduction chamber of a pressure apply piston unit and a pressure apply suction circuit of the pressure apply pump, and a circulation mode-select valve disposed in the circulation circuit for opening and closing of the latter. The circulation mode-select valve comprises a normally-open valve. An electronic control unit is provided for closing the circulation mode-select valve only during the traction-and-yaw control in which a pressure apply action of the pressure apply piston unit is required.

7 Claims, 2 Drawing Sheets

AUTOMOTIVE BRAKE CONTROL SYSTEM WITH SKID CONTROL UNIT AND TRACTION AND VEHICLE DYNAMICS CONTROL UNIT

BACKGROUND OF THE INVENTION

1. Field of the Invention

The present invention relates to a brake control system for automotive vehicles, and specifically to a computer-controlled braking system with a skid control unit (an ABS unit) acting to prevent a wheel lock-up condition during deceleration and provide maximum effective braking, and a traction and vehicle dynamics control unit acting to suppress a so-called acceleration slip which may often occur when rapidly accelerating or being capable of actively producing a proper yawing moment necessary for improving a vehicle stability or a vehicle dynamics (e.g., a cornering stability or steer characteristics) by virtue of a computer-controlled wheel-brake cylinder pressure.

2. Description of the Prior Art

In recent years, there have been proposed and developed various computer-controlled braking systems with both a skid control unit (of ten called an "ABS unit" or an "ABS hydraulic unit") and a traction and vehicle dynamics control unit (substantially corresponding to a "traction-and-yaw control hydraulic unit"). In such a conventional computer-controlled braking system having both an ABS unit and a traction-and-yaw control unit, the ABS unit usually includes a plurality of fluid-pressure control valves and a return pump, often called an "ABS pump", required for a skid control. On the other hand, the traction-and-yaw control unit generally includes a brake-fluid pressure apply pump (or a brake-fluid pressure supply pump) serving to rise a wheel-brake cylinder pressure during the traction control or during the vehicle dynamics control (yaw control). On more later-model anti-skid braking systems with an ABS unit and a traction-and-yaw control hydraulic unit, a brake-fluid pressure apply piston is further disposed between the brake-fluid pressure apply pump and each brake circuit of a dual-brake system for the purpose of indirectly supplying the brake-fluid pressure via the pressure apply piston unit. One such computer-controlled braking system has been disclosed in an international application No. PCT/DE93/00802, filed Sep. 4, 1993 (PCT publication No. WO 94/07720, published Apr. 14, 1994), corresponding to Japanese patent publication No. 7-501506, published Feb. 16, 1995.

The braking system with an ABS device, disclosed in the international application No. PCT/DE93/00802, is applied to an automotive vehicle with a dual-brake system in which a hydraulic brake system is split into two sections or two hydraulic circuits, for example a front section and a rear section, respectively connected to two associated wheel-brake cylinders. The ABS hydraulic unit is designed to join, at a confluent point or a connection port, two kinds of brake-fluid pressures, namely a master-cylinder pressure generated from an outlet/inlet port of the master-cylinder pressure and a discharge pressure of working fluid discharged from the return pump of the ABS hydraulic unit, and then supplies a controlled hydraulic pressure, being properly regulated or controlled by a hydraulic pressure control valve unit (which is component parts of the ABS unit and typically comprises a plurality of electromagnetic solenoid valves such as two-port two-position directional control valves), into a wheel-brake cylinder which is subjected to a skid control. The brake-fluid pressure apply piston unit is arranged in a brake line close to the tandem master cylinder rather than the ABS unit. The pressure apply piston unit slidably accommodates therein a partitioning piston through which an internal space defined in the cylinder portion of the pressure apply piston unit is partitioned into a primary chamber communicating the outlet of a brake-fluid pressure supply pump (an auxiliary pump) and a secondary chamber being connected to the ABS unit. A directional control valve is also disposed in the associated brake circuit between the ABS unit and the secondary chamber of the pressure apply piston, in such a manner as to maintain the associated brake circuit at a fully-open state during its de-activated state, and to serve, during its activated state, as a pressure-differential sensitive external-pilot operating type directional control valve that functions to permit fluid flow from the ABS unit to the secondary chamber when the pressure differential between inlet and outlet ports of the directional control valve is above a predetermined value, and to block fluid flow from the ABS unit to the secondary chamber when the pressure differential is below the predetermined value. A two-port two-position directional control valve is fluidly disposed between the secondary chamber and the suction port of the return pump (the main pump) of the ABS unit for establishing fluid communication therebetween under its activated state (fully opened), and for blocking the fluid communication under its de-activated state (fully closed). In the pressure apply piston unit, an intermediate small-diameter section of the partitioning piston defines a pressure chamber in conjunction with the inner cylindrical peripheral surface of the cylinder portion. The pressure chamber communicates with one outlet/inlet port of the dual master cylinder. Also provided in the secondary chamber is a check valve which is designed to permit fluid communication between the pressure chamber and the secondary chamber under a condition in which a volumetric capacity of the primary chamber is reduced to the minimum volumetric capacity with the partitioning piston held at the spring-loaded position, and to prevent back flow to the pressure chamber when the piston is shifted towards the secondary chamber by a predetermined stroke and the fluid pressure in the pressure chamber becomes greater than the fluid pressure in the secondary chamber by a predetermined pressure level. With the previously-discussed arrangement of the prior art, when a master-cylinder pressure is produced with depression of the brake pedal, the master-cylinder pressure is transmitted from the pressure chamber to the secondary chamber, and then delivered through the pressure-differential sensitive external-pilot operating type directional control valve via the ABS unit (including a plurality of 2-port 2-position directional control valves) into the respective wheel-brake cylinders, thus ensuring a braking action depending on depression of the brake pedal. During the braking action, when a skid control for a less-traction skidding wheel is executed in response to a control command from an electronic control unit (ECU) or electronic control module (ECM), the return pump of the ABS unit is driven, a wheel-brake cylinder pressure of the less-traction skidding wheel is cyclically regulated in accordance with either one of three pressure control modes, namely a pressure-reduction mode, a pressure-hold mode (more precisely a high-pressure hold mode or a low-pressure hold mode), and a pressure build-up mode. These three modes can be repeatedly executed until the slip rate of the skidding wheel is adjusted within a predetermined target slip-rate range (containing an ideal slip rate). On the other hand, during so-called traction control (or acceleration-slip control) or during vehicle dynamics control (which includes at least a vehicle stability control, a steer characteristics control, and a cornering stability control), a braking force must be applied to a desired road wheel so as to prevent undesired acceleration slip by actively generating a braking force, or to change the steer characteristics to neutral steer, or to generate a yawing moment counteracting the undesired vehicle behavior about the z-axis, even when the brakes are released. In the previously-noted conventional braking system, during the acceleration-slip control or during the vehicle dynamics control, the ECU drives both the pressure apply pump and the return pump and also energizes electromagnetic solenoids of the 2-port 2-position directional control valves (inflow valves) to open the 2-port 2-position directional control valves. With the pressure apply pump activated, the brake-fluid pressure in the primary chamber of the pressure apply piston unit is increased to a high level, and thus the increased pressure forces the piston into the secondary chamber, thereby permitting the brake fluid in the secondary chamber to be pushed out via the inflow valves into the wheel-brake cylinders assigned to the pressure build-up mode during the traction-and-yaw control. During the traction control or during the vehicle dynamics control, a fluid pressure of the brake fluid, pushed out from the pressure apply piston and directed towards the wheel-brake cylinders, can be properly regulated by the ABS unit. On the other hand, since brake fluid is temporarily stored in a reservoir fluidly disposed in the return line when a pressure-reduction mode is being executed, just after the pressure-reduction mode the return pump can sufficiently suck brake fluid in from the reservoir of the return line and feed the pumped brake fluid to the wheel-brake cylinder. Thus, after the pressure-reduction mode, the pressure apply action of the pressure apply piston unit is unnecessary. The previously-noted pressure apply piston unit generally comprises a pressure-apply check valve. The check valve is designed to block fluid communication between the secondary chamber and the outlet/inlet port of the master cylinder when the pressure apply piston is axially shifted apart from the spring-loaded position to reduce the volumetric capacity of the secondary chamber. The previously-discussed conventional brake control system suffers from the following drawbacks.

The return pump and the pressure apply pump are driven by respective motors, and thus the prior art brake control system is large-sized. Supposing that a single motor is used for driving both the return pump and the pressure apply pump, even during the skid control (ABS control), an undesired pressure-apply action will be made by means of the pressure apply pump driven simultaneously during operation of the return pump and as a result the fluid pressure in the outlet port of the pressure apply pump becomes risen undesirably. This results in an increase in the motor load, and lowers an energy efficiency. Also, the conventional system is designed that the pressurized fluid from the pressure apply pump is supplied to a pair of brake-fluid pressure apply piston units each provided in the associated one of two channel brake systems and then the pressure is applied via the two pressure apply pistons to brake fluid in respective wheel-brake cylinders. It is desired that a braking action can be actively made to a desired wheel-brake cylinder of four wheel cylinders in response to a control command from the ECU even during the vehicle dynamics control with the brake pedal released. Actually, during the vehicle dynamics control, there is less possibility that active braking actions (or automatic, computer-controlled braking actions) for all of the four wheel cylinders are necessary. Usually, the number of wheel-brake cylinders, being subjected to each individual automatic braking action (a skid control or a traction-and-yaw control), is less than four. However, on the conventional system, during the vehicle dynamics control the pressure apply action would be made to all of the wheel-brake cylinders and thus the ABS unit must operate at either a pressure-reduction mode or a pressure-hold mode when a fluid pressure in a wheel-brake cylinder, which cylinder never requires the pressure apply action, is risen undesiredly. In other words, there is a tendency for the pressure apply pump and the pressure apply piston unit to be activated wastefully. Additionally, the conventional system is designed to shut off the fluid communication between the outlet/inlet port of the master cylinder and the ABS unit by means of only one check valve fluidly disposed in the secondary chamber of the pressure apply piston unit. If the fluid-flow passage area (the size of the valve opening) of this single pressure-apply check valve is narrowed due to debris, there is a tendency of constricting back flow from the wheel-brake cylinder to the master cylinder, thus disturbing satisfactory pressure-drop in the wheel cylinder when the driver releases the brakes.

SUMMARY OF THE INVENTION

Accordingly, it is an object of the invention to provide an automotive brake control system with a skid control unit and a traction and vehicle dynamics control which avoids the aforementioned disadvantages of the prior art.

It is another object of the invention to provide a comparatively small-sized automotive brake control system with a skid control unit and a traction and vehicle dynamics control, utilizing a single motor connected in common to both a return pump (an ABS pump) for a skid control and a brake-fluid pressure apply pump for traction-and-yaw control for simultaneously driving them, which system is capable of avoiding a discharge pressure of brake fluid discharged from the brake-fluid pressure apply pump from acting as a load of the single motor during the skid control, thus enhancing an energy efficiency and improving fuel consumption of the vehicle.

It is a further object of the invention to provide an automotive brake control system with a skid control unit and a traction and vehicle dynamics control, which ensures satisfactory return flow from a wheel cylinder to a master cylinder, irrespective of whether a check valve fluidly disposed in a brake-fluid pressure apply piston unit does not function owing to the check-valve opening size undesirably narrowed by debris or the like.

It is a still further object of the invention to provide an automotive brake control system with a skid control unit and a traction and vehicle dynamics control, which is capable of preventing a wasteful pressure apply action of a brake-fluid pressure apply piston and a brake-fluid pressure apply pump during traction and vehicle dynamics control.

In order to accomplish the aforementioned and other objects of the present invention, an automotive brake control system with a skid control unit and a traction and vehicle dynamics control unit, comprises an operating-pressure generating device for generating a brake fluid pressure based on a magnitude of depression of a brake pedal, a wheel-brake cylinder being adapted to be attached to a road wheel for generating a braking force applied to the road wheel, a brake circuit connected between the operating pressure generating device and the wheel-brake cylinder, a skid control hydraulic unit fluidly disposed in the brake circuit, and operated in response to a control signal, and including a fluid-pressure control valve unit being capable of operating at a selected one of three modes consisting of a pressure-reduction mode, a pressure-hold mode and a pressure build-up mode to reduce, hold, or build up a wheel-cylinder pressure in said wheel-brake cylinder (WC), a return pump returning brake fluid in the wheel-brake cylinder via a return line to a downstream line of the brake circuit, and a reservoir connected to the return line for temporarily storing the brake fluid from the wheel-brake cylinder, a pressure apply device including a pressure apply pump operated in response to a control signal and a pressure apply piston unit operated in response to a discharge pressure from the pressure apply pump, the pressure apply piston unit comprising a cylindrical housing, and a piston axially slidably accommodated in the cylindrical housing and dividing an internal space of the cylindrical housing into a pressure apply chamber and a pressure introduction chamber, the pressure apply chamber being connected via a pressure apply circuit to the skid control hydraulic unit, and the pressure introduction chamber being connected to a pressure-apply discharge circuit connected to an outlet of the pressure apply pump so that brake fluid in the pressure apply chamber is directed to the skid control hydraulic unit with a sliding motion of the piston when the discharge pressure is introduced from the pressure apply pump into the pressure introduction chamber, a control unit generating the control signals respectively transmitted to the skid control hydraulic unit and the pressure apply device so that during skid control the skid control hydraulic unit comes into operation and so that during traction and vehicle dynamics control a pressure apply action of the pressure apply device is executed with the skid control hydraulic unit being in an operative state, a single motor having a driving connection with both the return pump and the pressure apply pump, a circulation circuit intercommunicating the pressure-apply discharge circuit and a pressure-apply suction circuit connected to an inlet of the pressure apply pump, and a circulation mode-select valve disposed in the circulation circuit for establishing fluid communication of the circulation circuit in a de-energized position and for shutting off the fluid communication of the circulation circuit in an energized position, wherein the control unit operates to close the circulation mode-select valve only during the traction and vehicle dynamics control.

It is preferable that the pressure apply circuit is communicated with a suction circuit connected to an inlet of the return pump, wherein the pressure apply piston unit has a communication chamber defined between an outer periphery of an intermediate portion of the piston and an inner peripheral wall of the cylindrical housing and connected to the brake circuit to permanently communicate a port of the operating-pressure generating device with the downstream line of the brake circuit regardless of an axial position of the piston, wherein the pressure apply piston unit has a communication passageway communicating the communication chamber with the pressure apply chamber and a pressure apply check valve disposed in the communication passageway for permitting fluid flow from the communication chamber to the pressure apply chamber and for restricting back flow to the communication chamber, wherein a brake-circuit check valve is disposed in a line of the brake circuit between the pressure apply piston unit and the skid control hydraulic unit for permitting fluid flow from the communication chamber to the skid control hydraulic unit and for restricting back flow to the communication chamber, wherein a bypass circuit is arranged parallel to the brake-circuit check valve and a first gate valve is disposed in the bypass circuit for establishing fluid communication of the bypass circuit in a de-energized position and for shutting off the fluid communication of the bypass circuit, wherein a first relief circuit is connected between the pressure apply circuit and a line of the brake circuit upstream of the brake-circuit check valve, and has a first relief valve which is shifted to an open position for relieving brake fluid in the pressure apply circuit to a line of the brake circuit upstream of the brake-circuit check valve when a pressure differential between a fluid pressure in the pressure apply circuit and a fluid pressure in the brake circuit is above a set pressure of the first relief valve, and wherein a second relief circuit is connected between the pressure apply circuit and a line of the brake circuit downstream of the brake-circuit check valve and downstream of the first gate valve, and has a second relief valve which is shifted to an open position for relieving brake fluid in the brake circuit to the pressure apply circuit when a pressure differential between a fluid pressure in the brake circuit and a fluid pressure in the pressure apply circuit is above a set pressure of the second relief valve. Preferably, the set pressure of the first relief valve may be set at a predetermined low pressure level based on a brake fluid pressure generated by the operating-pressure generating means during light depression of the brake pedal, whereas the set pressure of the second relief valve may be set at a predetermined high pressure level based on a brake fluid pressure generated by the operating-pressure generating means during hard depression of the brake pedal. Preferably, the previously-noted brake circuit may be formed as one of both channels of a divided and dual brake system, and also the pressure apply pump may comprise a multi-plunger type hydraulic pump having at least two plungers and being capable of discharging brake fluid by reciprocating motion of the at least two plungers. It is preferable that the pressure apply discharge circuit is provided for each of the at least two plungers, and additionally a pressure introduction circuit is provided to join brake fluids discharged from the pressure apply discharge circuits associated with the respective plungers in the pressure introduction circuit so that the joined brake fluid is introduced into the pressure introduction chamber. The circulation circuit is provided to communicate the pressure introduction circuit with the pressure apply suction circuit, and a second gate valve is also disposed in the pressure apply circuit downstream of connection ports of the first and second relief valves for shutting off fluid communication of the pressure apply circuit in a de-energized position and for establishing the fluid communication of the pressure apply circuit in an energized position. More preferably, a third relief circuit with a third relief valve is connected between the pressure introduction circuit and the pressure apply suction circuit in parallel to the circulation circuit. The third relief valve is designed to relieve brake fluid in the pressure introduction circuit to the pressure apply suction circuit when a pressure differential between a fluid pressure in the pressure introduction circuit and a fluid pressure in the pressure apply suction circuit is above a set pressure of the third relief valve. Preferably, the operating-pressure generating device may comprise a tandem master cylinder. It is preferable that the previously-noted control unit may operate to open the first gate valve and to close the second gate valve and to open the circulation mode-select valve during the normal braking, and operate to close the first gate valve and to close the second gate valve and to open the circulation mode-select valve during the skid control, and operate to close the first gate valve and to open the second gate valve and to close the circulation mode-select valve during the traction and vehicle dynamics control.

DESCRIPTION OF THE PREFERRED EMBODIMENTS

Figure 1:
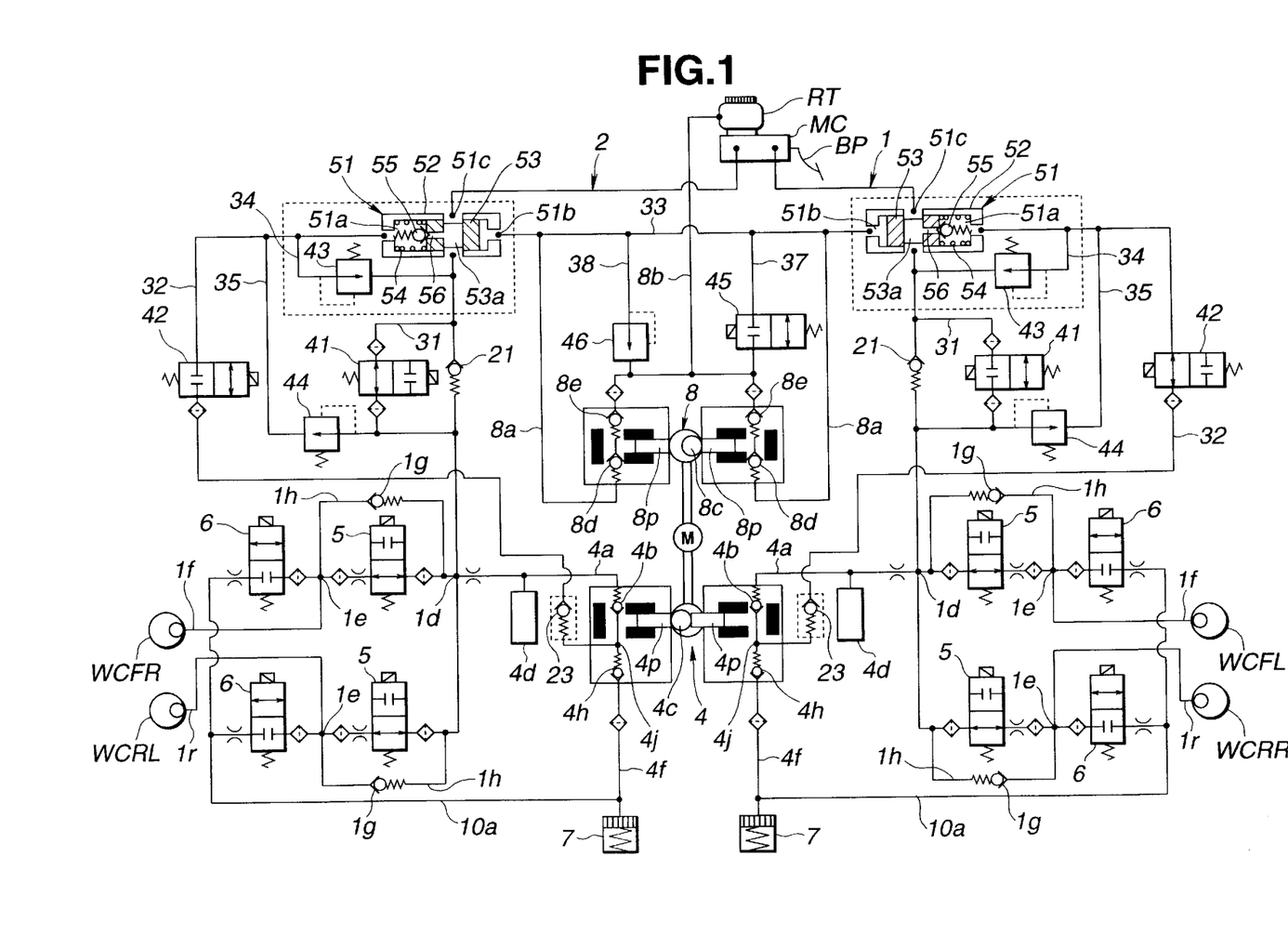
FIG. 1 is a hydraulic system diagram illustrating a preferred embodiment of an automotive brake control system of the invention.

Referring now to the drawings, particularly to FIG. 1, the automotive brake control system of the invention is exemplified in an automotive vehicle with a divided and dual brake system. In FIG. 1, MC denotes a typical tandem master cylinder with a two pistons, set in tandem. As can be appreciated from the hydraulic brake circuits shown in FIG. 1, as an example, the automotive brake control system of the embodiment is applied to a diagonal split hydraulic brake system, often called a "X-split brake system", each half serving a front road wheel on one side and a rear road wheel on the other side. One hydraulic brake circuit associated with both a front-left wheel-brake cylinder WCFL and a rear-right wheel-brake cylinder WCRR will be hereinafter referred to as a "first channel brake circuit", whereas the other hydraulic brake circuit associated with both a front-right wheel-brake cylinder WCFR and a rear-left wheel-brake cylinder WCRL will be hereinafter referred to as a "second channel brake circuit". The first and second channel brake circuits are denoted respectively by "1" and "2". The previously-noted master cylinder MC, the first and second channel brake circuits are provided for serving as an operating pressure generating device (or an operating pressure generating means) for the respective wheel-brake cylinders. In the embodiment, the master cylinder MC mechanically linked to the brake pedal BP is used as an essential element constructing the operating pressure generating means. Alternatively, the operating pressure for the respective wheel-brake cylinder may be generated by means of an external pressure source and a computer-controlled pressure control valve unit which can properly regulate a brake-fluid pressure generated by the external pressure source in response to an electrical signal representative of an amount of depression of the brake pedal BP, and then deliver the regulated brake-fluid pressure to each individual wheel-brake cylinder. A tank unit RT, located above the tandem master cylinder MC, denotes a master-cylinder reservoir storing brake fluid (or working fluid). As seen in FIG. 1, to avoid repetition, only the structure of the first channel brake circuit (related to the wheels WCFL and WCRR) is hereinbelow described in detail, since the structure of the left-hand hydraulic brake circuit (the second channel brake circuit) is almost equal to the structure of the right-hand hydraulic brake circuit (the first channel brake circuit). As the brake pedal BP is depressed, the piston in the master cylinder MC applies pressure to the brake fluid. The pressure forces the brake fluid through one of two inlet/outlet ports of the tandem master cylinder MC via a front-left wheel-brake cylinder branch circuit 1*f* and a rear-right wheel-brake cylinder branch circuit 1*r* into the respective brake-wheel cylinders WCFL and WCRR, which will be generally referred to as the wheel cylinders WC. An inflow valve 5 and an outflow valve 6 are fluidly disposed in each of the branch circuits 1*f* and 1*r*. As seen in FIG. 1, when the inflow valve 5 is de-activated, the inflow valve 5 is maintained at its spring-loaded position (corresponding to a full fluid-communication position) by way of a return spring (not numbered). When the inflow valve 5 is activated, the inflow valve 5 is shifted to its fully-closed position. The inflow valve 5 is comprised of a typical electromagnetically-controlled, two-port two-position directional control valve (a normally-open type electromagnetic solenoid valve). On the other hand, the outflow valve 6 is branched from the associated one of the branch circuits 1*f* and 1*r* at the branch point 1*e* (or the branch port) closer to the associated wheel-brake cylinder as compared with the inflow valve 5, and connected to an ABS reservoir 7 fluidly connected to an intermediate portion of an exhaust circuit (a return line) 10*a*. When the outflow valve 6 is de-activated, the exhaust circuit 10*a* is shut off. When the outflow valve 6 is activated, the exhaust circuit 10*a* is fully opened and thus the brake fluid in the associated wheel-brake cylinder is directed via the outflow valve 6 and the exhaust circuit 10*a* into the suction port of a main pump (a return pump, often called an "ABS" pump). As appreciated, the outflow valve 6 is comprised of a typical electromagnetically-controlled, two-port two-position directional control valve (a normally-closed type electromagnetic solenoid valve). Located in the middle of each of the branch circuits 1*f* and 1*r*, is an inflow-valve bypass line 1*h* with a one-way check valve 1*g*. The bypass line 1*h* is arranged parallel to the inflow valve 5. The downstream end of the exhaust circuit 10*a* is connected to a main suction circuit 4*f* communicating with the suction port of the main pump 4. A suction-side one-way check valve 4*h* is fluidly disposed in the middle of the main suction circuit 4*f*, for permitting the main pump 4 to suck in the brake fluid from the ABS reservoir 7 and for restricting back flow from the suction port of the main pump 4 to the ABS reservoir 7. The outlet port of the main pump 4 is connected via a discharge-side one-way check valve 4*b* to a main discharge circuit 4*a*. The main discharge circuit 4*a* is connected to a connection point 1*d* (or a connection port) which is disposed upstream of the respective branch circuits 1*f* and 1*r* of the first channel brake circuit 1. A hydraulic element denoted by "4*d*" is a hydraulic damper which is connected to the main discharge circuit 4*a* for effectively absorbing undesired pulsation of the brake fluid discharged from the main pump 4. The main pump 4 has a pair of plungers (4*p*, 4*p*) each end of which is in cam-connection with a single eccentric cam 4*c*. The cam 4*c* is attached to the drive shaft (or the output shaft) of an electric motor M in a manner so as to be eccentrically arranged with respect to the axis of the drive shaft. The cam 4*c* acts to convert rotational motion of the cam to reciprocating motion of each of the plungers. With this arrangement, both of the pump plungers (4*p*, 4*p*) reciprocate to provide a pumping action when the cam 4*c* is driven by the motor M. As may be appreciated from FIG. 1, the phase difference between the two opposing plungers (4*p*, 4*p*) is 180 degrees. The operations of the main pump 4, the inflow valve set (5, 5) and the outflow valve set (6, 6) are properly controlled by means of an electronic control unit (ECU or simply CU) or an electronic control module (ECM), depending on vehicle operating conditions such as a so-called deceleration slip (wheel lock occurring owing to excessive braking action), a so-called acceleration slip (wheel spin occurring at drive wheels owing to excessive driving torque applied to the drive wheels), or undesired vehicle behavior (containing excessive understeer or oversteer) about the z-axis in an earth-fixed axis system. The main pump 4, the inflow valves 5 and the outflow valves 6, and the ABS reservoir 7 construct an ABS unit. That is, if a certain road wheel experiences wheel lock during braking, the inflow valve 5 (connected to the skidding less-traction wheel) is fully closed, and the outflow valve 6 (connected to the skidding less-traction wheel) is fully opened, and the ABS pump 4 is driven in response to control commands from the electronic control unit CU, and thus the brake fluid in the wheel cylinder of the skidding less-traction wheel is directed through the outflow valve 6 towards the ABS reservoir 7. As a result, the wheel-cylinder pressure of the skidding less-traction wheel is reduced. The reduced wheel-cylinder pressure decreases the braking force applied to the skidding less-traction wheel, thus avoiding wheel lock. This operating mode is usually referred to as a "pressure reduction mode". Under these conditions, when the inflow valve 5 and the outflow valve 6 are both closed, the wheel-cylinder pressure is held constant. This operating mode is commonly referred to as a "pressure hold mode". With the inflow valve 5 and the outflow valve 6 kept closed, when the slip rate of the road wheel, which is subjected to the skid control, is less than a predetermined slip rate (essentially corresponding to an ideal slip rate), the inflow valve 5 is opened again and also the outflow valve 6 is closed, with the result that the working fluid discharged from the ABS pump 4 is directed via the inflow valve 5 to the wheel cylinder. As a result, the wheel-cylinder pressure (the braking force) can be increased. This operating mode is usually referred to as a "pressure build-up mode". The previously-discussed three different operating modes are cyclically repeated. As a consequence, during the skid control the ABS system partly releases the brakes, so that the wheels continue to rotate, however braking action continues. During the skid control, the braking torque is held to just below a so-called skidding point where a skid would begin. Therefore, the maximum braking effect can be obtained. During the previously-noted ABS control (the skid control), the main pump (the ABS return pump) 4 continues to be driven by the motor M, and the brake fluid temporarily stored in the ABS reservoir 7 is sucked in the inlet port of the main pump 4 and then discharged into the first channel brake circuit 1. A brake-circuit check valve 21 is fluidly disposed in the first channel brake circuit 1 upstream of the connection point 1d, for permitting brake-fluid flow from the upstream side of the first channel brake circuit 1 to the downstream side of the first channel brake circuit 1, and for restricting back flow therethrough towards the upstream side. Both ends of a bypass circuit 31 are connected to the first channel brake circuit 1 so that the bypass circuit 31 is arranged parallel to the brake-circuit check valve 21. A first gate valve 41 is fluidly disposed in the bypass circuit 31, bypassing the check valve 21. When the first gate valve 41 is de-energized, the first gate valve 41 is maintained at its spring-loaded position (corresponding to a full fluid communication position) by means of the spring bias of a return spring built in the first gate valve unit. On the contrary, when the first gate valve 41 is energized, the first gate valve 41 is maintained at its fully closed position with shifting motion of the electromagnetic solenoid slidably disposed in the first gate valve unit, and as a result the bypass circuit 31 is cut off. In the shown embodiment, the first gate valve is comprised of a typical two-port two-position electromagnetic directional control valve (a normally-open type electromagnetic solenoid valve). During the automatic braking action executed by the control unit CU, such as a skid control, or a traction-and-yaw control, the first gate valve 41 is electromagnetically closed in response to a control command (or an instruction signal) from the control unit CU, to prevent the controlled brake-fluid pressure from being transmitted to the master cylinder MC.

One end of a brake-fluid pressure apply circuit 32 is connected to a branch point 4j (or the branch port) located in the main suction circuit 4f between the suction port of the main pump 4 and the suction-side check valve 4h. The other end of the brake-fluid pressure apply circuit 32 is a brake-fluid pressure apply chamber 51a of a brake-fluid pressure apply piston unit 51 fluidly disposed in the first channel brake circuit 1. A second gate valve 42 is fluidly disposed in the middle of the first channel brake circuit 1. In the shown embodiment, a back-flow prevention check valve 23 is also provided between the branch point 4j and the second gate valve 42. When the second gate valve 42 is de-activated, the second gate valve 42 is maintained at its spring-loaded position (corresponding to a shut-off position). When the second gate valve 42 is activated, the second gate valve 42 is shifted to its valve full-open position. The second gate valve is comprised of a typical two-port two-position electromagnetic directional control valve (a normally-open type electromagnetic solenoid valve). Details of the brake-fluid pressure apply piston unit 51 are described hereunder. The pressure apply piston unit 51 comprises a cylindrical piston housing (or a cylinder portion) 52 and a partitioning pressure-apply piston 53. The piston 53 is slidably accommodated in the cylinder portion 52, and acts to divide an internal space in the cylinder portion 52 into two chambers, namely a primary chamber 51a (or a pressure apply chamber) and a secondary chamber 51b (or a pressure introduction chamber). An intermediate portion of the piston 53 is formed as a small-diameter middle constricted section 53a. The small-diameter section 53a defines a communication chamber 51c defined in axially spaced relationship with respect to the primary chamber 51a by the right-hand land portion of the piston 53 and axially spaced apart from the secondary chamber 51b by the left-hand land portion of the piston 53. A return spring 54 is operably disposed in the primary chamber 51a in a manner so as to force the piston 53 in the axially leftward direction (viewing FIG. 1) that the volumetric capacity of the secondary chamber 51b is reduced. Assuming that no pressure is applied to the pressure introduction chamber 51b, the pressure apply piston 53 is kept at its spring-loaded position (corresponding to the leftmost position in the right half of the brake system diagram of FIG. 1, or corresponding to the rightmost position in the left half of the brake system diagram of FIG. 1). The piston 53 also includes a communication passageway 56 formed as an axial bore and intercommunicating the communication chamber 51c and the primary chamber 51a. A pressure-apply check valve (serving as a one-way check valve) 55 is disposed in the communication passageway 56 for permitting fluid flow from the communication chamber 51c to the primary chamber 51a, and for restricting back flow to the communication chamber 51c. The above-mentioned communication chamber 51c is fluidly disposed in the middle of the first channel brake circuit 1 in such a manner as to intercommunicate the upstream and downstream sides of the first channel brake circuit 1. On the other hand, the pressure introduction chamber (the secondary chamber 51b) is connected to a pressure introduction circuit 33. One end of a first relief circuit 34 is connected to the connection line between the outlet port of the pressure apply piston unit 51 and the second gate valve 42. The other end of the first relief circuit 34 is connected to the first channel brake circuit 1 upstream of the check valve 21. One end of a second relief circuit 35 is also connected to the connection line between the outlet port of the pressure apply piston unit 51 and the second gate valve 42. The other end of the second relief circuit 35 is connected to the first channel brake circuit 1 just downstream of the check valve 21 and simultaneously connected to the downstream end of the bypass circuit 31. A first relief valve 43 is disposed in the first relief circuit 34, whereas a second relief valve 44 is disposed in the second relief circuit 35. The first relief valve 43 serves as a low-pressure relief valve whose set pressure is a predetermined low-pressure level such as 20 Kg/cm². Actually, the set pressure of the first relief valve 43 is set at a predetermined low pressure level based on a master-cylinder pressure Pm generated by the master cylinder MC during light depression of the brake pedal. When a pressure differential between the fluid pressure in the above-mentioned connection line (between the outlet port of the pressure apply piston unit 51 and the second gate valve 42) and the fluid pressure in the brake line (1; 2) upstream of said brake-circuit check valve 21 exceeds the first-relief-valve set pressure such as 20 Kg/cm², the first relief valve 43 opens to relieve a part of the brake fluid in the connection line into the first channel brake circuit 1. The second relief valve 44 serves as a high-pressure relief valve whose set pressure is a predetermined high pressure level such as 120 Kg/cm². An external pilot port of the second relief valve 44 receives the fluid pressure of the downstream side of the check valve 21 and the first gate valve 41, whereas the other port of said relief valve 44 receives the fluid pressure in the pressure apply circuit 32. When a pressure differential between the fluid pressure introduced into the external pilot port and the fluid pressure introduced into the other port exceeds the predetermined high-pressure level such as 120 Kg/cm², the second relief valve 44 opens to relieve a part of the brake fluid in the first channel brake circuit 1 into the pressure apply circuit 32. The set pressure of the second relief valve 44 is set at a predetermined high pressure level based on a master-cylinder pressure Pm generated by the master cylinder MC during hard depression of the brake pedal. A brake-fluid pressure apply pump 8 applies pressure to the brake fluid in the pressure introduction circuit 33. The structure of the pressure apply pump 8 is similar to that of the previously-discussed main pump 4. The pressure apply pump 8 also has a pair of plungers (8p, 8p) each end of which is in cam-connection with a single eccentric cam 8c attached to the drive shaft of the motor M. When the cam 8c is rotated by the motor M, the two plungers (8p, 8p) can reciprocate in their axial directions, while keeping in cam-connection with the cam 8c. Thus, each of the plungers (8p, 8p) provide a pumping action. The plunger chamber in which each of the plungers can reciprocate, is connected via a plunger discharge port to a pressure-apply discharge circuit 8a with a discharge-side one-way check valve 8d and connected via a plunger suction port to a pressure-apply suction circuit 8b with a suction-side one-way check valve 8e. The downstream end of the pressure-apply discharge circuit 8a is connected to the pressure introduction circuit 33, whereas the upstream end of the pressure-apply suction circuit 8b is connected to the master-cylinder reservoir RT. The external pressure source containing the pressure apply pump 8 and the pressure apply piston unit 51 operates as follows. When the ABS pump 4 is driven by the motor M, at the same time the pressure apply pump 8 is also driven by the same motor. During operation of the pressure apply pump 8, the brake fluid stored in the master-cylinder reservoir RT is sucked into the inlet port of the pump 8 and then discharged into the pressure introduction circuit 33. As discussed above, note that the cam 4c of the main pump 4 and the cam 8c of the pressure apply pump 8 are both driven in common by means of the single electric motor M. Additionally, a brake fluid circulation circuit 37 and a third relief valve 38 are both arranged in parallel with each other and connected between the pressure introduction circuit 33 and the pressure-apply suction circuit 8b. The brake fluid circulation circuit 37 is provided for introducing the discharged, pressurized brake fluid from the pressure apply pump 8 directly into the suction port of the pressure apply pump 8 and for circulating the brake fluid through the check valve 8e, the inlet port of the pump 8, the outlet port of the pump 8, the check valve 8d, the pressure-apply discharge circuit 8a, the pressure introduction circuit 33, and the pressure-apply suction circuit 8b, in that order. In other words, the brake fluid circulation circuit 37 ensures a brake-fluid circulation mode in which the pressure apply pump 8 does not work practically. In order to switch from the above-mentioned brake-fluid circulation mode to a working mode (or a pressure-apply mode), a circulation-mode switching valve 45 (or a circulation mode-select valve) is disposed in the brake-fluid circulation circuit 37. As appreciated from FIG. 1, the circulation switching valve 45 is comprised of a typical two-port two-position electromagnetic shut-off valve (a normally-open type electromagnetic solenoid valve). The opening and closing action of the circulation mode-select valve 45 is controlled in response to a control command (or an instruction signal) from the control unit CU. When the circulation mode-select valve 45 is de-energized, the brake-fluid circulation circuit 37 operates at the fluid circulation mode to permit circulation of brake fluid through the circulation circuit 37. When the circulation mode-select valve 45 is energized, the brake-fluid circulation circuit 37 operates at the working mode at which the pressurized brake fluid, discharged from the pump 8, is introduced into the pressure introduction chamber 51b and acts on the pressure apply piston 53. As will be fully described later, the circulation mode-select valve 45 is energized during the traction-and-yaw control. During normal braking or during skid control, the circulation mode-select valve 45 is de-energized. A third relief valve 46 is fluidly disposed in the third relief circuit 38 so that an external pilot port of the third relief valve 46 receives the fluid pressure in the pressure introduction circuit 33 and the other port of the third relief vale 46 receives the fluid pressure in the pressure-apply suction circuit 8b. The third relief valve 46 serves as a low-pressure relief valve whose set pressure is a predetermined low-pressure level such as 10 Kg/cm². When a pressure differential between the fluid pressure in the pressure introduction circuit 33 and the fluid pressure in the pressure-apply suction circuit 8b exceeds the predetermined low-pressure level such as 10 Kg/cm², the third relief valve 46 opens to relieve brake fluid in the pressure introduction circuit 33 into the pressure apply suction circuit 8b. Details of the control unit CU are explained below.

Figure 2:
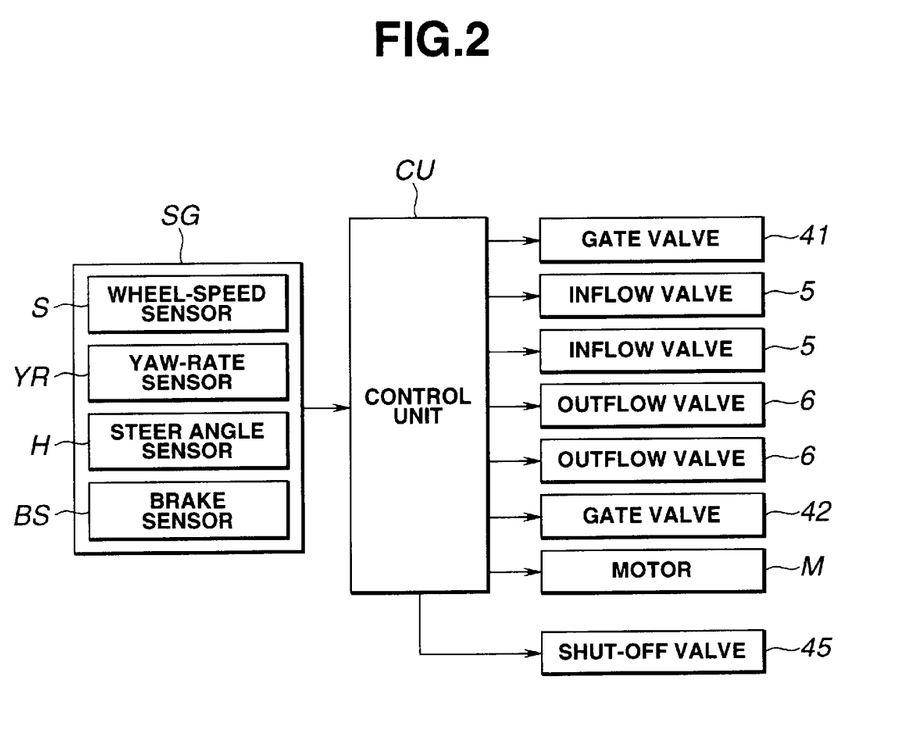
FIG. 2 is a block diagram illustrating the connection relationship among various vehicle sensors, an electronic control unit (ECU), and various valves employed in the brake control system of the embodiment.

Referring now to FIG. 2, the control unit CU functions to control the activating and de-activating of the motor M, and the opening and closing of each of the electromagnetic solenoid valves (5, 5), (6, 6), 41, 42 and 45. The electronic control unit CU is generally comprised of a microcomputer that is typical of that now in use many passenger cars and trucks. Although it is not clearly shown in FIG. 2, the control unit CU usually contains an input/output interface, a central processing unit (CPU), and a memory device (RAM/ROM). The input/output interface of the CU receives signals from a group of vehicle sensors SG, namely a wheel-speed sensor S, a yaw-rate sensor YR, a steer angle sensor H, and a brake sensor BS. The processor (CPU) of the control unit CU processes the signals from the sensor group SG in accordance with a pre-programmed task. The memory device (RAM/ROM) is designed to store data or programs, or to temporarily store the results of ongoing arithmetic calculations until they are required for use by the CPU. As seen in FIG. 2, the input/output interface of the control unit CU is also connected to the respective solenoid valves (5, 5), (6, 6), 41, 42 and 45, and the motor M, so as to properly control the activation and de-activation of each of the solenoid valve and the on and off operations of the motor M. The previously-noted wheel-speed sensor S is provided at each of road wheels, for sensing a wheel speed of each road wheel. The yaw-rate sensor YR is provided for monitoring a yaw rate or a yaw moment about the z-axis. The steer angle sensor H is provided for monitoring a steer angle of the vehicle. Usually, the brake sensor BS is a brake switch which generates a high-level signal (ON signal) when depressing the brake pedal BP, and generates a low-level signal (OFF signal) when the brakes are released. The control unit CU determines the presence or absence of braking action depending on a signal from the brake sensor BS. For example, when a value of the signal from the brake sensor BS is a high voltage signal, the control unit CU determines that the brakes are applied. Also, the control unit CU arithmetically calculates a slip rate of each of road wheels, based on signals from the various sensors SG. In a conventional manner, the control unit CU begins to execute a skid control when the calculated slip rate of a certain road wheel exceeds a predetermined slip rate (corresponding to a pre-programmed threshold value), during braking. When the control unit CU compares the calculated slip rate to the pre-programmed threshold value and determines that the vehicle experiences a so-called acceleration slip at drive wheels during non-braking, a drive-wheel slip prevention control, often called a "traction control" is initiated. Additionally, when the control unit CU compares the sensor signals from the sensor group SG to pre-programmed levels and determines that the vehicle loses directional stability for example during cornering, the control unit CU executes a vehicle dynamics control, namely a yaw control, to generate a yawing moment counteracting the undesired vehicle behavior (containing excessive understeer or oversteer) or undesired yaw rotation about the z-axis. During the skid control, during the traction control, or during the yaw control, the application and release of the solenoid valves (5, 5) and (6, 6) are processed to select a proper mode from the pressure-reduction mode, the pressure-hold mode, and the pressure build-up mode, and thus to ensure maximum effective braking (maximum vehicle deceleration) during braking and to prevent undesired wheel lock-up, or to prevent application of excessive driving torque to the driven wheels when accelerating, or to compensate for undesired steering characteristics (for example strong understeer or oversteer) towards neutral during cornering. Such a method for controlling or regulating a wheel-cylinder pressure is conventional and forms no part of the present invention, and thus details of the method f or controlling the wheel-cylinder pressure are omitted. Actually, the activation of the main pump (the ABS return pump) 4 is necessary during the skid control. On the other hand, during the traction-and-yaw control, the activation of the main pump 4 and the activation of the pressure apply pump 8 are both necessary. In the shown embodiment, since the two pumps 4 and 8 have a driven connection with the same single motor M, these pumps 4 and 8 are driven simultaneously by the single motor M in response to the control command signal from the control unit CU. The automotive brake control system of the embodiment operates as follows.

As seen in the left-half (the second channel brake circuit) of the brake system diagram shown in FIG. 1, the solenoid valves (5, 5), (6, 6), 41, 42 and 45 are usually maintained at their respective de-activated positions. Under these conditions, when the brakes are applied with the brake pedal BP depressed, the master-cylinder pressure is transmitted via each of the first and second channel brake circuits 1 and 2, that is, through the communication chamber 51c of the pressure apply piston unit 51, the first gate valve 41 or the brake-circuit check valve 21, via the inflow valves 5 and the respective branch circuits 1f and 1r, into the wheel cylinders WC. Since the magnitude of the master-cylinder pressure Pm increases as the amount of depression of the brake pedal BP increases, the braking force applied to the road wheel is adjusted depending on the amount of depression of the brake pedal during normal braking. As seen in the left half of the brake system diagram of FIG. 1, during normal braking, the second gate valve 42 is held at the fully closed position, and thus there is no fluid flow from the communication chamber 51c to the pressure apply chamber 51a. Thereafter, when the brakes are released, the brake-fluid in the wheel-brake cylinders returns through the brake circuits 1 and 2 to the respective master-cylinder inlet/outlet ports in the reverse order of brake-fluid supply. During this brake-fluid returning action, the brake fluid is returned from the wheel-brake cylinders through the bypass circuit 31 to the master cylinder MC, because the brake-circuit check valve 21 operates to check the return fluid-flow via the corresponding brake circuit containing the check valve 21 to the communication chamber 51c of the pressure apply piston unit 51.

During braking, when the control unit CU determines, on the basis of the result of comparison between the calculated slip rate of each road wheel and the predetermined threshold level, that a road wheel is skidding or a skid starts to develop at a certain road wheel, the control unit CU executes a skid control such that the slip rate of the skidding less-traction wheel is adjusted within the predetermined threshold level. As is generally known, during the skid control, the wheel-cylinder pressure control cycle containing at least the pressure-reduction mode, the pressure-hold mode, and the pressure build-up mode is repeated to prevent wheel lock-up and thus to ensure maximum effective braking. Assuming that the result of arithmetic calculation for a slip rate of a road wheel exceeds a first predetermined threshold during braking action, the control unit CU operates to activate the first gate valve 41 to maintain the valve 41 at its closed position. At the same time, the control unit CU begins to energize the motor M. On the other hand, the circulation mode-select valve 45 and the second gate valve 42 are held at their spring-loaded positions (the de-activated positions), that is, the circulation mode-select valve 45 is kept at its full-open position whereas the second gate valve 42 is kept at its closed position. During the skid control, the control unit CU operates to activate both the inflow valve 5 and the outflow valve 6 of either the branch circuits 1r or 1f associated with the skidding less-traction wheel. Thus, this inflow valve 5 is shifted to the closed position, while this outflow valve 6 is shifted to the open position. With the outflow valve 6 fully opened, the brake fluid in the wheel-brake cylinder of the skidding less-traction wheel is exhausted through the exhaust circuit 10a into the ABS reservoir 7, with the result that the wheel-cylinder pressure of the skidding less-traction wheel is reduced effectively and a braking force applied to the skidding wheel is also reduced. The brake fluid exhausted into or temporarily stored in the ABS reservoir 7 is sucked via the main suction circuit 4f into the inlet port of the return pump 4, and then returned via the main discharge circuit 4a to the corresponding channel of the brake circuits 1 and 2. As a result of the pressure reduction mode, when the calculated slip rate of the road wheel, which is subjected to the skid control, will become below the first predetermined threshold, the control unit CU stops to activate the outflow valve 6 and continues to activate the inflow valve 5. Thus, the outflow valve 6 and the inflow valve 5 are both kept in their closed positions, to ensure the pressure-hold mode. During the pressure-hold mode, when the most recent arithmetic calculation data of the slip rate for the road wheel subjected to the skid control will become less than a second predetermined threshold different from the first predetermined threshold, the control unit CU operates to de-activate the inflow valve 5 and also to keep the outflow valve 6 at the closed position (the de-activated position), and as a result the inflow valve 5 is shifted to the full-open position with the outflow valve remaining closed. As a consequence, the brake fluid of the respective channel of brake circuits 1 and 2, being increasing at a high-pressure level, is directed via the inflow valve 5 into the wheel cylinder WC subjected to the skid control. This reincreases a braking force applied to the road wheel subjected to the skid control. In this manner, the cycle is repeated until the slip rate of the road wheel subjected to the skid control is adjusted within the predetermined slip-rate range. Note that the brake-fluid pressure apply pump 8 as well as the return pump 4 are driven by way of the same motor M during the skid control, and that the circulation mode-select valve (the shut-off valve) 45 is simultaneously maintained at its full-open position. Therefore, during the skid control, the pressure apply pump 8 is operating at the brake-fluid circulating mode in which the brake fluid is circulating through the pressure apply pump 8, the pressure-apply discharge circuit 8a, the pressure introduction circuit 33, the brake fluid circulation circuit 37 and the pressure-apply suction circuit 8b, and additionally the pressure apply pump 8 itself scarcely acts as a load applied to the motor M. As can be appreciated, during the brake-fluid circulating mode, the pressure apply pump 8 does not work practically, and thus no fluid pressure or less fluid pressure is applied to the brake fluid in the pressure introduction chamber 51b. Under this condition, the pressure apply piston 53 is maintained at the spring-loaded position. Also, even in the presence of the master-cylinder pressure Pm, there is no flow of brake fluid from the communication chamber 51c to the pressure apply chamber 51a, since the second gate valve 42 is kept at the closed state during the skid control. Thereafter, when the driver releases the brakes and then the skid control ends, the control unit CU operates to de-activate the first gate valve 41 to establish fluid communication of each of the first and second channel brake circuits 1 and 2, and to return the inflow valves 5 and the outflow valves 6 to their initial positions (their spring-loaded positions) as shown in FIG. 1. As a consequence, the brake fluid in the wheel-brake cylinders returns through the hydraulic brake circuits 1 and 2 to the respective master-cylinder inlet/outlet ports in the reverse order of brake-fluid supply in the same manner as during normal braking. On the other hand, the brake fluid exhausted into and stored in the ABED reservoir 7 is returned via the associated one of the first and second channel brake circuits 1 and 2 to the master cylinder MC by virtue of pumping operation of the ABS return pump 4 for a predetermined brief moment which time period is pre-programmed in the ROM of the memory device of the control unit CU. As soon as the predetermined brief moment has been elapsed, the motor M is stopped, and thus the skid control terminates.

Additionally, the control unit CU can execute the so-called traction control (or the acceleration-slip suppression control) or the vehicle dynamics control containing the yaw control. When rapidly starting or when quickly accelerating, the rate of acceleration-slip often exceeds a predetermined threshold level. In the event that the acceleration-slip rate exceeds the predetermined threshold during a rapid start or during a quick acceleration, the control unit CU initiates the traction control. On the other hand, when the vehicle loses directional stability on turns for example, the control unit CU executes the vehicle dynamics control so as to generate a yawing moment counteracting undesired vehicle behavior and to compensate for the yawing moment about the z-axis in a direction of stable vehicle behavior. The previously-noted traction-and-yaw control is executed depending on the control command signal from the control unit CU, irrespective of the presence or absence of depressing action of the brake pedal BP.

Details of the vehicle dynamics control or the traction-and-yaw control executed during non-depression of the brake pedal are described below.

During the vehicle dynamics control, the control unit CU operates to activate all of the circulation mode-select valve 45, the first and second gate valves 41 and 42, and the motor M, as shown in the right half of the brake system diagram of FIG. 1. With the motor M rotating, the pressure apply pump 8 is driven, and thus the brake fluid in the master-cylinder reservoir RT is sucked through the pressure-apply suction circuit 8b into the inlet port of the pump 8, and then discharged through the pressure-apply discharge circuit 8a into the pressure introduction circuit 33. During the vehicle dynamics control without depression of the brake pedal BP, since the circulation mode-select valve 45 is kept at its shut-off position, the discharged and pressurized brake fluid cannot circulate through the pressure apply pump 8, but be introduced into the pressure introduction chamber 51b of the pressure apply piston unit 51. Thus, the fluid pressure is applied to the piston pressure-receiving surface facing to the pressure introduction chamber 51b and then the piston 53 slides rightward (viewing the right half of the diagram of FIG. 1) against the bias of the return spring 54. As a result, a part of the brake fluid in the pressure apply chamber 51a is forced or discharged into the pressure apply circuit 32 owing to a change in volumetric capacity of the pressure apply chamber 51a resulting from the axial sliding motion of the piston 53. The brake fluid forced into the pressure apply circuit 32 is fed through the second gate valve 42 fully opened, via the check valve 23, to the branch port 4j, and then discharged through the ABS return pump 4, and fed via the main discharge circuit 4a into the branch circuits 1f and 1r. At this time, the control unit CU properly controls the opening and closing of the inflow valves 5 and the opening and closing of the outflow valves 6 to optimally regulate the fluid pressure in each of the wheel-brake cylinders WC. If the skid control does not execute just before initiation of the vehicle dynamics control, usually there is less brake fluid stored in the ABS reservoir 7 at the starting period of the vehicle dynamics control. For this reason, during the starting period of the vehicle dynamics control a sufficient amount of brake fluid cannot be supplied from the ABS reservoir 7 towards the suction port of the return pump 8. To produce a discharge pressure caused by the return pump 4, the activation of the pressure apply pump 8 is necessary. That is to say, during the vehicle dynamics control without depression of the brake pedal BP, the pressure apply pump 8 must be driven. During the vehicle dynamics control when the pressure apply pump 8 is driven by the motor M, one pressure receiving surface of the pressure apply piston 53 receives the discharge pressure from the pump 8. The axial sliding motion of the piston 53 applies pressure to the brake fluid in the pressure apply circuit 32. This pressure forces the brake fluid in the apply circuit 32 via the check valve 23 into the inlet of the return pump 4 with the second gate valve 42 fully opened. In this manner, during the vehicle dynamics control without depression of the brake pedal, the pressure apply pump 8 and the pressure apply piston unit 51 cooperate with each other to ensure sufficient pumping action of the return pump 4. When the vehicle dynamics control is being executed, the wheel-cylinder pressure of each wheel cylinder WC is properly regulated by controlling the opening and closing of the solenoid valves 5 and 6. During the pressure-reduction mode of the vehicle dynamics control, surplus brake fluid is exhausted into the reservoir 7. The brake fluid exhausted into the reservoir 7 is sucked into the return pump 4 at any time when the pump 4 is working, and then discharged into the first and second channel brake circuits 1 and 2. If the pressure differential between the brake-fluid pressure in each of the brake circuits 1 and 2 and the fluid pressure in the pressure apply circuit 32 will become above the predetermined high pressure level (e.g., 120 Kg/cm$^2$) essentially corresponding to the set pressure of the second relief valve 44 during the vehicle dynamics control, the second relief valve 44 shifts to the full-open position, and thus the fluid pressure in the brake circuit (1, 2) is reduced to the set pressure of the second relief valve 44 by relieving the high-pressure fluid into the pressure application circuit 32. In this manner, when apart of the brake fluid in the brake circuit (1, 2) is returned via the second relief valve 44 to the pressure apply circuit 32, the volumetric capacity of the pressure apply chamber 51a is enlarged depending on the volume of brake fluid returned into the pressure apply circuit 32 with the sliding motion of the pressure apply piston 53 towards the spring-loaded position. During the vehicle dynamics control without brake-pedal depression, if the pressure differential between the brake-fluid pressure in the pressure introduction circuit 33 and the fluid pressure in the pressure-apply suction circuit 8b will become above the predetermined low pressure level (e.g., 10 Kg/cm$^2$) essentially corresponding to the set pressure of the third relief valve 46, the third relief valve 46 opens, and thus a part of the brake fluid in the pressure introduction circuit 33 is relieved through the third relief circuit 38 and the pressure-apply suction circuit 8b, and then sucked into the inlet of the pressure apply pump 8. Therefore, the fluid pressure in the pressure introduction circuit 33 is maintained at or below the set pressure (e.g., 10 Kg/cm$^2$) of the third relief valve 46. Thereafter, when the vehicle dynamics control routine must be ended, the control unit CU operates to de-activate all of the first gate valve 41, the circulation mode-select valve 45 and the motor M, so that the first gate valve 41 is shifted to the valve open position, the circulation mode-select valve 45 is shifted to the full-open position (the circulating mode position), and the motor M is stopped. As a result of the shifting of the valves 41 and 45 and stopping of the motor M, there is no or less apply pressure applied to the fluid in the pressure introduction chamber 51b of the pressure apply piston unit 51. As a result, the piston 53 is returned to the spring-loaded position. Additionally, the brake fluid returned from the wheel cylinders WC or from the return pump 4 into the channel brake circuit (1, 2) is returned into the pressure apply chamber 51a via the pressure apply check valve 55 which check valve is opened in response to the pressure differential between the communication chamber 51c and the pressure apply chamber 51a. Also, the brake fluid introduced into the pressure introduction chamber 51b is returned through the circulation mode-select valve 45 and the pressure-apply suction circuit 8b into the master-cylinder reservoir RT.

To the contrary discussed above, during the vehicle dynamics control with depression of the brake pedal BP, the operation of the vehicle dynamics control is dependent on the depression force of the brake pedal BP (or the magnitude of the master-cylinder pressure Pm). When the vehicle dynamics control is executed under a comparatively low master-cylinder pressure Pm (Pm<Pc) whose pressure level is below a channel circuit pressure Pc in a line between the second relief valve 44 and the return pump 4, the brake-circuit check valve 21 cannot be opened by such a low master-cylinder pressure fed into the associated brake circuit via the communication chamber 51c. On the other hand, during vehicle dynamics control, the bypass circuit 31 is also shut off with the first gate valve 41 kept at its energized position (closed position). Therefore, when the master-cylinder pressure Pm is low, the low master-cylinder pressure cannot be supplied via the check valve 21 or the first gate valve 41 to the downstream side of the associated brake circuit (1, 2). On the other hand, the check valve 55 of the pressure apply piston unit 51 can open under the low master-cylinder pressure, and thus this low master-cylinder pressure is introduced into the pressure apply chamber 51a. Under these conditions, a spring biasing force of the return spring 54 and a pressure of brake fluid introduced in the pressure apply chamber 51a both act (leftwards in the right half of the brake system diagram of FIG. 1 and rightwards in the left half of the brake system diagram of FIG. 1) as a resultant force on one piston pressure-receiving surface facing to the pressure apply chamber 51a. At this time, the axial position of the piston 53 is determined depending upon the magnitude relationship between this resultant force and the axial pushing force created by the fluid pressure acting on the other pressure-receiving surface facing to the pressure introduction chamber 51b, such that the axial pushing force acting on the other pressure-receiving surface is balanced to the previously-noted resultant force. Thus, the axial pushing force acting on the other pressure-receiving surface can be adjusted to or below the set pressure (e.g., 10 Kg/cm$^2$) of the third relief valve 46. Under these conditions, for instance, as per the right-half brake circuit of FIG. 1, when the resultant force acts axially leftwards and greater than the axial pushing force acting on the left piston end (the other pressure-receiving surface), the piston 53 is pushed back towards the spring-loaded position in the axially leftward direction. The axially leftward movement of the piston 53 results in a pressure rise in the pressure introduction circuit 33. As a result, if the third-relief-valve set pressure such as 10 Kg/cm$^2$ has been reached, the third relief valve 46 begins to open and thus some of the brake fluid in the pressure introduction chamber 33 is returned to the master-cylinder reservoir RT via the pressure-apply suction circuit 8b.

The fluid introduced from the communication chamber 51c via the check valve 55 into the pressure apply chamber 51a, is fed through the pressure apply circuit 32 via the check valve 23 and the connection port 4j into the suction portion of the return pump 4. In this manner, as the amount of brake fluid fed into the return pump 4 gradually increases, the supply amount of brake fluid in the brake circuit downstream of both the brake-circuit check valve 21 and the first gate valve 41 increases. As a result, the fluid pressure in the hydraulic line connecting between these valves 21 and 41 and the inflow and outflow valves 5 and 6 rises. As a result, if the set pressure (120 Kg/cm$^2$) of the second relief valve 44 has been reached, the second relief valve 44 opens to return surplus brake fluid to the pressure apply circuit 32, in the same manner as during the vehicle dynamics control without depression of the brake pedal. At this time, when the pressure differential between the fluid pressure in the connection line between the outlet port of the pressure apply piston unit 51 and the second gate valve 42 and the fluid pressure in the brake circuit (1; 2) exceeds the set pressure (20 Kg/cm$^2$) of the first relief valve 43 under the comparatively low master-cylinder pressure Pm resulting from termination of the braking action, the first relief valve 43 is opened. With the first and second relief valves 43 and 44 opened, the brake fluid returns through the second relief valve 44, the second relief circuit 35, the connection line of the pressure apply circuit 32, the first relief circuit 34, the first relief valve 43 and the communication chamber 51c back to the master cylinder MC. The amount of the return brake fluid to the master cylinder corresponds to the amount of brake fluid introduced via the check valve 55 into the pressure apply chamber 51a. Details of the wheel-cylinder pressure control or regulation related to the computer-controlled opening and closing actions of a pair of inflow and outflow valves 5 and 6, executed during the vehicle dynamics control with light brake-pedal depression, and the operation of termination of the vehicle dynamics control are similar to the controlling operation of the vehicle dynamics control without brake-pedal depression discussed previously. To avoid repetition, detailed description of the pressure regulation of the respective wheel-brake cylinder, achieved by controlling of the opening and closing of the inflow and outflow valves 5 and 6 will be omitted because the above description thereon seems to be self-explanatory.

On the contrary, when the vehicle dynamics control is executed under a comparatively high master-cylinder pressure Pm (Pm≧Pc) whose pressure level is above the previously-noted channel pressure Pc, the brake-circuit check valve 21 can be opened by the high master-cylinder pressure introduced a into the communication chamber 51c, and thus the brake fluid of the high master-cylinder pressure is fed via the brake-circuit check valve 21 into the downstream side of the brake circuit (1, 2). Additionally, during the vehicle dynamics control with hard depression of the brake pedal BP, the high master-cylinder pressure opens the pressure apply check valve 55 and thus the brake fluid of the high mater-cylinder pressure is introduced into the pressure apply chamber 51a. The introduction of high-pressure brake fluid into the pressure apply chamber 51a causes the piston 53 to move to the spring-loaded position leftwards (in the right half of the brake system diagram of FIG. 1). On the other hand, the master-cylinder pressure introduced via the check valve 21 and the first gate valve 41 into the brake circuit (1, 2) is properly regulated to a desired pressure level by means of the inflow and outflow valve pair 5 and 6, and transmitted to the respective wheel-brake cylinder WC. At this time, in the event that the fluid pressure in the brake circuit (1, 2) downstream of the check valve 21 rises to a high pressure level and then the predetermined high pressure level (the set pressure of the second relief valve 44) has been reached, surplus brake fluid is relieved via the second relief valve 44 to the pressure apply circuit 32. Thereafter, when the driver releases the brakes and thus the braking action terminates, the master-cylinder pressure Pm becomes low. Under these conditions, if the deviation of the fluid pressure in the pressure apply circuit 32 from the master-cylinder pressure Pm exceeds the set pressure (20 Kg/cm$^2$), the first relief valve 43 opens. As a result, the brake fluid in the pressure apply circuit 32 can be returned through the first relief valve 43 via the communication chamber 51c into the master cylinder MC until the first relief valve 43 is shifted to the closed position owing to a pressure drop in brake fluid in the pressure apply circuit 32.

As will be appreciated from the above, in the automotive brake control system of the embodiment, the brake fluid circulation circuit 37 is provided to communicate the pressure introduction circuit 33 with the pressure-apply suction circuit 8b and also the circulation mode-select valve 45 is provided to connect and disconnect the pressure introduction circuit 33 (the discharge side of the pressure apply pump 8) to and from the pressure-apply suction circuit 8b (the suction side of the pressure apply pump 8). Therefore, even when the cams 4c and 8c of the return pump 4 and the pressure apply pump 8 are rotated in common by way of the single motor M, during normal braking or during skid control the brake fluid in a brake line connected to inlet and outlet ports of the pressure apply pump 8 merely circulates through the pump inlet and outlet ports via the circulation mode-select valve 45 remaining opened and thus the pressure apply pump 8 does not work. During the ABS control, the pressure apply pump 8 scarcely acts as a load of the motor M. The circulation mode-select valve 45 is shifted to the fully-closed position to shut off the circulation circuit 37 only during the vehicle dynamics control (during the traction-and-yaw control). During the vehicle dynamics control (with the circulation mode-select valve 45 closed), the discharge pressure generated by the pressure apply pump 8 is introduced into the pressure introduction chamber 51b, and the wheel-brake cylinder pressure regulating operation of the ABS unit (the return pump 4, the inflow valves 5 and the outflow valves 6, and the ABS reservoir 7) can be attained by virtue of the pressure apply action of the pressure apply piston unit 51. This ensures an increased efficiency of the motor M (an increased energy efficiency) during the skid control, and thus the structure and entire size of the system can be reduced. Furthermore, the second gate valve 42 is disposed in the pressure apply circuit 32 to communicate the pressure apply chamber 51a of the pressure apply piston unit 51 with the suction port of the return pump 4, for the purpose of shutting off or fully opening the pressure apply circuit 32. With the second gate valve 42 closed, even when the pressure apply pump 8 is driven, the piston 53 cannot move in a direction that the piston 53 moves apart from the spring-loaded position, and whereby a pressure apply action of the piston unit 51 is not obtained. The use of the second gate valve 42 enables a discharge pressure generated by the pressure apply pump 8 to be introduced into either one of both channels of brake circuits 1 and 2, by energizing either one of the two gate valves (42, 42) respectively included in the right and left channels 1 and 2. During normal braking, the brake fluid is certainly transmitted from the master cylinder side to the wheel-brake cylinder side without being bypassed towards the ABS return pump 4. On the other hand, during operation of the pressure apply pump 8, the system can select a desired mode from two operating modes, one being a pressure-apply action inhibition mode in which the pressure apply action of the piston unit 51 associated with the second gate valve 42 remaining closed is inhibited, and the other being a pressure-apply permissible mode in which the pressure apply action of the piston unit 51 associated with the second gate valve 42 remaining open is permitted. This ensures an improved energy efficiency, and whereby the pressure apply pump 8 and the motor M can be both small-sized. In the shown embodiment, the pressure apply pump 8 has a pair of reciprocating plungers (8p, 8p) and the brake fluid discharged from one of both the plungers (8p, 8p) is not introduced into only the associated one of the pressure introduction chambers (51b, 51b) of both channels of the brake circuits 1 and 2, but first joins in the pressure introduction circuit 33 (serving as a confluent circuit). Then, the brake fluid discharged from the plunger pair (8p, 8p) into the confluent circuit 33 can be supplied or directed to the pressure apply piston unit 51 in which the piston 53 is freely slidable with the second gate valve 42 fully opened. In case that the pressure apply action is required for only one of both channels 1 and 2, the joined brake fluid discharged from the two plungers (8p, 8p) can be delivered. Thus the pressure apply action can be effectively rapidly performed, because the pressure of the joined brake fluid is generally higher than a discharge pressure of brake fluid discharged from either one of the two plungers (8p, 8p). That is, the system of the invention can exhibit a superior pressure-rise performance during the pressure apply action, as compared to the prior art. Additionally, in the system of the embodiment, the pressure apply piston unit 51, associated with the respective channel of brake circuit (1, 2), is formed in its cylinder portion 52 with the communication chamber 51c permanently connecting the associated one of two ports of the tandem master cylinder MC to the wheel-brake cylinders WC connected to the associated brake-circuit channel 1 or 2. Thus, when the vehicle dynamics control terminates, in both channels 1 and 2 the brake fluid in the respective wheel-brake cylinders (WCFL, WCRR; WCFR, WCRL) can be certainly returned through the fully-opened inflow valves (5, 5), the connection port 1d, the fully-opened first gate valve 41 in the bypass circuit 31, via the communication chamber 51c to the master cylinder MC. A fail-safe performance of the system of the embodiment is greatly enhanced. Moreover, in the system of the embodiment, the third relief circuit 38 is connected between the pressure introduction circuit 37 and the pressure-apply suction circuit 8b, in parallel to the brake fluid circulation circuit 37. The third relief circuit 38 contains the third relief valve 46 which opens to relieve part of the brake fluid in the pressure introduction circuit 33 into the pressure-apply suction circuit 8b when a set pressure of the third relief valve 46 has been reached due to a pressure rise in the pressure introduction circuit 33. Therefore, during the pressure apply action or during operation of the pressure apply pump 8, the third relief valve 46 and the third relief circuit 38 cooperate to each other to avoid an excessively high fluid pressure from being applied to the pressure introduction circuit 33 connected to the pressure introduction chamber 51b. This third relief circuit 38 containing the third relief valve 46 serves as a protection hydraulic circuit for the pressure apply pump 8 and all hydraulic circuits connected to the pump 8.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An automotive brake control system with a skid control unit and a traction and vehicle dynamics control unit, comprising:

an operating-pressure generating device (MC) for generating a brake fluid pressure (Pm) based on a magnitude of depression of a brake pedal;

a wheel-brake cylinder (WC) being adapted to be attached to a road wheel for generating a braking force applied to the road wheel;

a brake circuit (1; 2) connected between said operating pressure generating device (MC) and said wheel-brake cylinder (WC);

a skid control hydraulic unit fluidly disposed in said brake circuit, and operated in response to a control signal, and including a fluid-pressure control valve unit (5, 6) being capable of operating at a selected one of three modes consisting of a pressure-reduction mode, a pressure-hold mode and a pressure build-up mode to reduce, hold, or build up a wheel-cylinder pressure of said wheel-brake cylinder (WC), a return pump (4) returning brake fluid in said wheel-brake cylinder (WC) via a return line (10a, 4f) to a downstream line of said brake circuit, and a reservoir (7) connected to the return line for temporarily storing the brake fluid from said wheel-brake cylinder (WC);

a pressure apply device including a pressure apply pump (8) operated in response to a control signal and a pressure apply piston unit (51) operated in response to a discharge pressure from said pressure apply pump (8);

said pressure apply piston unit (51) comprising:
  a cylindrical housing (52); and
  a piston (53) axially slidably accommodated in said cylindrical housing (52) and dividing an internal space of said cylindrical housing (52) into a pressure apply chamber (51a) and a pressure introduction chamber (51b), said pressure apply chamber (51a) being connected via a pressure apply circuit (32) to said skid control hydraulic unit (4, 5, 6, 7), and said pressure introduction chamber (51b) being connected to a pressure-apply discharge circuit (8a) connected to an outlet of said pressure apply pump (8) so that brake fluid in said pressure apply chamber (51a) is directed to said skid control hydraulic unit with a sliding motion of said piston (53) when the discharge pressure is introduced from said pressure apply pump (8) into said pressure introduction chamber (51b);

a control unit (CU) generating the control signals respectively transmitted to said skid control hydraulic unit and said pressure apply device so that during skid control said skid control hydraulic unit comes into operation and so that during traction and vehicle dynamics control a pressure apply action of said pressure apply device is executed with said skid control hydraulic unit being in an operative state;

a single motor (M) having a driving connection with both said return pump (4) and said pressure apply pump (8);

a circulation circuit (37) intercommunicating said pressure-apply discharge circuit (8a) and a pressure-apply suction circuit (8b) connected to an inlet of said pressure apply pump (8): and a circulation mode-select valve (45) disposed in said circulation circuit (37) for establishing fluid communication of said circulation circuit (37) in a de-energized position and for shutting off the fluid communication of said circulation circuit (37) in an energized position, wherein said control unit (CU) operates to close said circulation mode-select valve (45) only during the traction and vehicle dynamics control.

2. The automotive brake control system as claimed in claim 1, wherein said pressure apply circuit (32) is communicated with a suction circuit (4f) connected to an inlet of said return pump (4), wherein said pressure apply piston unit (51) has a communication chamber (51c) defined between an outer periphery of an intermediate portion of said piston (53) and an inner peripheral wall of said cylindrical housing (52) and connected to said brake circuit (1; 2) to permanently communicate a port of said operating-pressure generating device (MC) with the downstream line of said brake circuit regardless of an axial position of said piston (53), wherein said pressure apply piston unit (51) has a communication passageway (56) communicating said communication chamber (51c) with said pressure apply chamber (51a) and a pressure apply check valve (55) disposed in said communication passageway (56) for permitting fluid flow from said communication chamber (51c) to said pressure apply chamber (51a) and for restricting back flow to said communication chamber (51c), wherein a brake-circuit check valve (21) is disposed in a line of said brake circuit between said pressure apply piston unit (51) and said skid control hydraulic unit for permitting fluid flow from said communication chamber (51c) to said skid control hydraulic unit and for restricting back flow to said communication chamber (51c), wherein a bypass circuit (31) is arranged parallel to said brake-circuit check valve (21) and a first gate valve (41) is disposed in said bypass circuit (31) for establishing fluid communication of said bypass circuit (31) in a de-energized position and for shutting off the fluid communication of said bypass circuit (31), wherein a first relief circuit (34) is connected between said pressure apply circuit (32) and a line of said brake circuit upstream of said brake-circuit check valve (21), and has a first relief valve (43) which is shifted to an open position for relieving brake fluid in said pressure apply circuit (32) to a line of said brake circuit upstream of said brake-circuit check valve (21) when a pressure differential between a fluid pressure in said pressure apply circuit (32) and a fluid pressure in said brake circuit is above a set pressure (20 Kg/cm$^2$) of said first relief valve (43), and wherein a second relief circuit (35) is connected between said pressure apply circuit (32) and a line of said brake circuit downstream of said brake-circuit check valve (21) and downstream of said first gate valve (41), and has a second relief valve (44) which is shifted to an open position for relieving brake fluid in said brake circuit (1; 2) to said pressure apply circuit (32) when a pressure differential between a fluid pressure in said brake circuit and a fluid pressure in said pressure apply circuit (32) is above a set pressure (120 Kg/cm$^2$) of said second relief valve (44).

3. The automotive brake control system as claimed in claim 2, wherein said set pressure (20 Kg/cm$^2$) of said first relief valve (43) is set at a predetermined low pressure level based on a brake fluid pressure (Pm) generated by said operating-pressure generating means (MC) during light depression of the brake pedal, and wherein said set pressure (120 Kg/cm$^2$) of said second relief valve (44) is set at a predetermined high pressure level based on a brake fluid pressure (Pm) generated by said operating-pressure generating means (MC) during hard depression of the brake pedal.

4. The automotive brake control system as claimed in claim 3, wherein said brake circuit is one of a first channel brake circuit (1) and a second channel brake circuit (2) of a divided and dual brake system, wherein said pressure apply pump (8) comprises a multi-plunger type hydraulic pump having at least two plungers (8p, 8p) and being capable of discharging brake fluid by reciprocating motion of said at least two plungers, and wherein said pressure apply discharge circuit (8a) is provided for each of said at least two plungers (8p, 8p), wherein a pressure introduction circuit (33) is provided to join brake fluids discharged from said pressure apply discharge circuits (8a, 8a) associated with the respective plungers (8p, 8p) in said pressure introduction circuit (33) so that the joined brake fluid is introduced into said pressure introduction chamber (51b), wherein said circulation circuit (37) is provided to communicate said pressure introduction circuit (33) with said pressure apply suction circuit (8b), and wherein a second gate valve (42) is disposed in said pressure apply circuit (32) downstream of connection ports of said first and second relief valves (43, 44) for shutting off fluid communication of said pressure apply circuit (32) in a de-energized position and for establishing the fluid communication of said pressure apply circuit (32) in an energized position.

5. The automotive brake control system as claimed in claim 4, wherein a third relief circuit (38) is connected between said pressure introduction circuit (33) and said pressure apply suction circuit (8b) in parallel to said circulation circuit (37), and has a third relief valve (46) which is shifted to an open position for relieving brake fluid in said pressure introduction circuit (33) to said pressure apply suction circuit (8b) when a pressure differential between a fluid pressure in said pressure introduction circuit (33) and a fluid pressure in said pressure apply suction circuit (8b) is above a set pressure (10 Kg/cm$^2$) of said third relief valve (46).

6. The automotive brake control system as claimed in claim 5, wherein said operating-pressure generating device comprises a tandem master cylinder (MC).

7. The automotive brake control system as claimed in claim 6, wherein said control unit (CU) operates to open said first gate valve (41) and to close said second gate valve (42) and to open said circulate on mode-select valve (45) during the normal braking, and operates to close said first gate valve (41) and to close said second gate valve (42) and to open said circulation mode-select valve (45) during the skid control, and operates to close said first gate valve (41) and to open said second gate valve (42) and to close said circulation mode-select valve (45) during the traction and vehicle dynamics control.

\* \* \* \* \*